Nov. 27, 1951     R. T. COOK     2,576,778
SPECTACLE FRAME MADE OF TUBULAR METALLIC STOCK
Filed Aug. 18, 1948
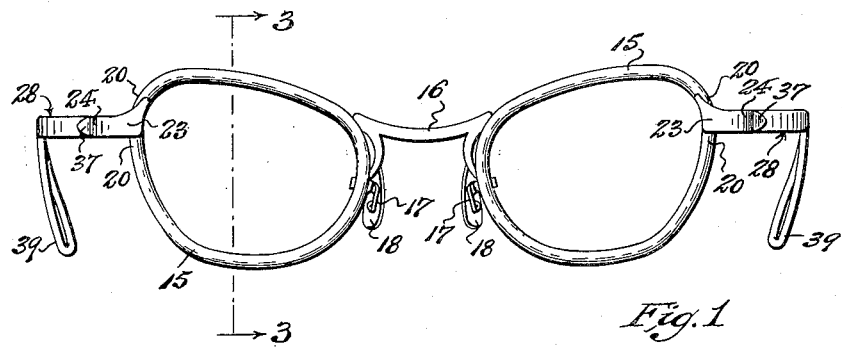
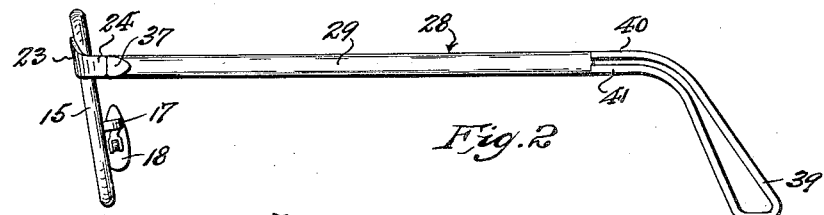
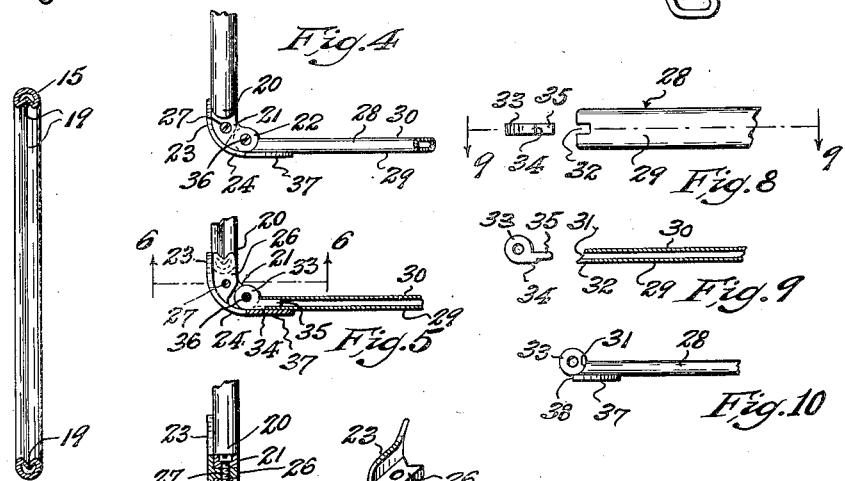
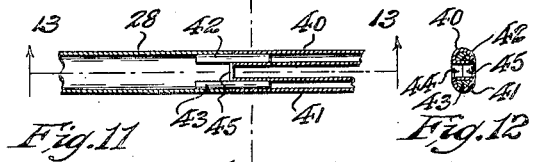
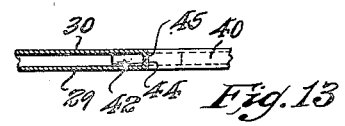
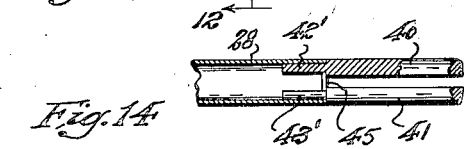
INVENTOR.
Roland T. Cook,
BY George D. Richards,
Attorney Patented Nov. 27, 1951

2,576,778

UNITED STATES PATENT OFFICE 2,576,778

SPECTACLE FRAME MADE OF TUBULAR METALLIC STOCK

Roland T. Cook, Irvington, N. J., assignor to New Jersey Optical Company, Irvington, N. J., a corporation of New Jersey Application August 18, 1948, Serial No. 44,915

1 Claim. (Cl. 88—53)

This invention relates to ophthalmic mountings, and the invention has reference, more particularly, to an improved metallic ophthalmic mounting of the spectacle frame type.

There is demand for spectacle frames of massive appearance, which demand, in the past, has been largely met by spectacle frames made of non-metallic materials, such, e. g., as those made of plastic material. Heretofore there does not appear to have been available an all metal spectacle frame which provides that massive appearance which is in vogue, probably for the reason that the weight of an all metal frame, calculated to provide the desired massive appearance, would render such frame impractical.

Having the above in view, it is an object of this invention to provide a novel construction of metallic spectacle frame which is calculated to possess a desired massive appearance and yet to be of light weight; and, to this end, to provide lens rim and temple portions of the frame which are produced from tubular metallic stock.

The invention has for another object to provide a spectacle frame structure having lens rim and temple portions made of tubular metallic stock, including novel structural formations thereof, and novel means for hingedly joining the temple portions to the lens portions.

Other objects of this invention, not at this time more particularly enumerated, will be understood from the following detailed description of the same.

An illustrative embodiment of the invention is shown in the accompanying drawings, in which:

Fig. 1 is a front face view of a spectacle frame made according to this invention; and Fig. 2 is a side elevational view of the same.

Fig. 3 is a detail cross-sectional view through a lens rim portion of the frame, taken on line 3—3 in Fig. 1, but drawn on an enlarged scale.

Fig. 4 is a fragmentary top plan view of a hinge joint structure by which a temple portion of the frame is connected with a lens rim portion thereof, this view being drawn on an enlarged scale; Fig. 5 is a horizontal sectional view through said hinge joint structure with parts shown in elevation; Fig. 6 is a transverse vertical sectional view, taken on line 6—6 in Fig. 5; and Fig. 7 is a perspective view of the cover plate and stop element of a hinge structure.

Fig. 8 is a fragmentary plan view of the inner end part of a temple member and hinge ear element in disassembled relation; Fig. 9 is a longitudinal sectional view taken on line 9—9 in Fig. 8, the hinge ear element being shown in elevation; and Fig. 10 is a top plan view of the inner part of a temple member having its hinge ear element and a stop element mounted in operative assembled relation thereto.

Fig. 11 is a fragmentary horizontal longitudinal sectional view of the outer part of a temple member; Fig. 12 is a vertical cross-sectional view, taken on line 12—12 in Fig. 11; Fig. 13 is a longitudinal sectional view, taken on line 13—13 in Fig. 11; and Fig. 14 is a view similar to that of Fig. 11, but showing a modified construction.

Similar characters of reference are employed in the hereinabove described views, to indicate corresponding parts.

Referring to the drawings, an illustrative embodiment of a spectacle frame according to this invention as shown comprises a front having temples hingedly connected with the outer sides of its lens rim members. Said front comprises a pair of lens rim members 15 which are joined by an intermediate nose bridge member 16, which is secured thereto, as by soldering, to extend between the opposed inner sides thereof. Also mounted on the inner side of each lens rim member 15, and suitably secured thereto, as by solder, are nose-pad supporting arms 17 to which nose-pads 18 are suitably connected.

Each lens rim member 15 is produced from thin walled tubular metallic stock of comparatively large cross-sectional area, preferably having an external diameter of from $\frac{3}{16}$ to $\frac{1}{8}$ inch approximately. The rim members as thus characterized are calculated to possess a massive appearance and yet to be of very light weight. The wall of said tubular metallic stock is indented along the longitudinal inner side extent of the rim member to form, at such location, an inverted V-shaped lens edge receiving and seating channel 19 (see Fig. 3). Each lens rim member is discontinuous, whereby to provide opposed terminal ends 20 at the outer sides thereof. Affixed to the respective terminal ends 20 of each rim member are the respective end pieces 21 which terminate in angularly and rearwardly offset perforate hinge knuckles 22, these elements forming parts of the temple hinging connections of the spectacle frame.

Adapted to be assembled with the end pieces 21 of each rim member 15 is a combined cover plate and stop element, the same comprising a face plate 23 which is adapted to be superposed upon and so as to lap the front sides of the adjacent terminal end portions 20 of the rim member and over the front edges of the end pieces 21 which extend from the latter. The outer end of the face plate 23 is curved, as at 24, to conform to the external contours of said end pieces, and the free end of said curved portion 24 provides a stop shoulder 25 which is aligned with the axis of the perforate hinge knuckles 22. Said face plate is provided, in extension from its inside, with a perforate anchor lug 26 which is adapted to be inserted between the end pieces 21 intermediate the rim member ends 20 and the hinge knuckles 22, so that the perforation of said anchor lug 26 is aligned with and between perforations with which the bodies of the end pieces 21 are provided. At least the lower of the perforations of said end piece bodies is internally screw-threaded for engagement by a fastening screw 27 which is passed through the thus assembled end pieces and anchor lug (see Fig. 6), whereby the end pieces and combined cover plate and stop element are secured together in operative assembled relation.

Each temple member is also produced from thin walled tubular metallic stock, and comprises a main tubular body portion 28 of somewhat flattened form, with the long axis of its cross-section perpendicular, so as to provide outer and inner face walls 29 and 30. The inner extremity 31 of the temple body portion 28 is shaped to conform the same to the circumferential contour of hinge knuckles 22 which are to be abutted thereby. Indenting the outer face wall 29 at the inner end part of the temple body portion 28 is a central longitudinal slot or notch 32. Adapted to be affixed to the inner end part of the temple body portion 28, in axially aligned relation to the latter, is a perforate hinge ear 33, which is provided with a tangential shoulder or key portion 34 adapted to be entered in said slot or notch 32; and with an axially projecting shank 35 projecting beyond said shoulder or key portion 34. Said shank 35 is adapted to fit into the open inner end of the temple body portion 28, and to be suitably secured thereto, as by soldering the same to the latter. When the hinge ear 33 is thus assembled in attached relation to the temple body portion, the engagement of the shoulder or key portion 34 in the slot or notch 32 keys the hinge ear to the temple body portion against rotative displacement from an operative horizontally disposed relation to the latter. To hingedly connect a temple body portion with a rim member 15 of the spectacle frame front, the hinge ear 33 is inserted between the hinge knuckles 22 of said rim member, and is then pivotally joined therewith by a pivoting screw 36 adapted to be engaged through the thus assembled hinge knuckles and hinge ear. Affixed to the outer face wall 29 of the temple body portion, as by soldering the same thereto, at the inner end of the latter, is a stop element 37 of suitable peripheral shape, but provided with a stop shoulder 38 at its outer end which is aligned with the axis of the above described hinge connection between a rim member 15 and said temple body portion. When the temple body portion is outswung to an angular rearwardly extending service relation to the rim member 15 with which it is connected, the stop shoulder 38 of the stop element 37 will abut the stop shoulder 25 of the previously described combined cover plate and stop element with which said rim member is provided, thus limiting the outswinging movement of the temple body portion, when its aforesaid service relation is attained.

Each temple body portion 28 is provided at and for extension from its outer end with a suitably shaped ear hook member. Said ear hook member, in one form thereof, is made of hollow metallic wire which is preferably of semi-circular cross-sectional shape, having an outer curvature of a radius corresponding to the radii of the curved top and bottom edges of the temple body portion 28. The ear hook member is formed by doubling the hollow wire upon itself into an end loop formation 39 of selected shape and extent, said end loop formation terminating in parallel upper and lower inwardly extending arms 40 and 41. Novel means is provided for attaching the ear hook member to the outer end of a temple body portion 28, whereby to complete the temple member. For this purpose there is affixed to the outer end portion of the temple body portion 28 within its upper edge portion an upper dowel or coupling pin 42 and within its lower edge portion a like lower dowel or coupling pin 43. Said dowels or coupling pins 42 and 43 may be anchored into the temple body portion 28 in any suitable manner, but preferably by soldering the same to the latter. Said dowels or coupling pins 42 and 43 project freely outward a substantial distance beyond the extremity of the temple body portion 28. The outer and inner face walls 29 and 30 of the temple body portion 28 are respectively provided with closure lugs 44 and 45 which are adapted to be in-turned to opposed abutting relation between said dowels or coupling pins 42 and 43 and across the open end of said temple body portion in closing relation thereto (see Figs. 12 and 13). Said dowels or coupling pins are of cross sectional shape corresponding to the internal cross sectional shape of the arms 40 and 41 of the ear hook member. The upper arms 40 of the ear hook member is telescoped over the outwardly projecting portion of the upper dowel or coupling pin 42, while the lower arm 41 of the ear hook member is telescoped over the outwardly projecting portion of the lower dowel or coupling pin 43; said arms and engaged dowels or coupling pins being thereupon securely united in any suitable manner, but preferably by soldering the same one to the other. When an ear hook member is thus attached in affixed relation to a temple body portion, the ends of the arms 40 and 41 will abut the end of the temple body portion, so that external surfaces of the former will lie flush to the rounded edge surfaces of the latter, thus providing a smooth and sightly joining of these parts, and one free from projections or other roughness which might be irritating to the wearer of the spectacle frame. It will be obvious that since the temple body portion and attached ear hook member are made of hollow or tubular metallic stock, not only will they contribute to the desired massive appearance of the frame as a whole, but will add but little weight thereto. As shown in Fig. 14, it will be seen that the ear hook members 39 and their arms 40—41 may be made of solid wire if desired, the latter terminating in reduced dowel portions 42'—43' for connection with the temple body portion 28, in manner substantially similar to that already above described.

From the above description and an inspection of the accompanying drawings, it will be apparent that the novel spectacle frame of this invention is well adapted to provide an all metal frame having a desired massive appearance, while nevertheless one which, notwithstanding its bulk is, in reality, of very light weight, comparing favorably with the weight of an ordinary solid metal frame as heretofore known and used.

Having now described my invention, I claim:

A hinge structure to connect a tubular temple to a discontinuous lens rim having end pieces terminating in perforate hinge knuckles projecting from its ends, a cover plate disposed over the front edges of the rim end pieces and adjacent portions of the lens rim, said cover plate having a rearwardly projecting anchoring lug interposed between said rim end pieces and secured in assembled relation thereto by a fastening screw, said anchoring lug functioning to space apart the hinge knuckles, the outer end of said cover plate providing a stop shoulder disposed across the hinge knuckles, a hinge ear having a rearwardly extending shank entered and fixed in the interior of the tubular temple, the outer wall of said temple having an indenting slot and said hinge ear having key portion outwardly offset relative to said shank and engaged in said slot, said hinge ear being entered between the rim hinge knuckles and coupled thereto by a pivoting screw, and an external face plate affixed to the temple, the outer end of said face plate providing a stop shoulder disposed across the hinge ear and adapted to abut the stop shoulder of the rim cover plate to determine the outswung open position of the temple relative to the rim.

ROLAND T. COOK.

REFERENCES CITED

The following references are of record in the file of this patent:

UNITED STATES PATENTS

| Number | Name | Date |
|---|---|---|
| 1,306,773 | Poeton | June 17, 1919 |
| 1,557,120 | Tully | Oct. 13, 1925 |
| 1,635,881 | Baker | July 12, 1927 |
| 1,906,330 | Nelson | May 2, 1933 |
| 1,941,575 | Page | Jan. 2, 1934 |
| 1,988,423 | Rohrback | Jan. 15, 1935 |
| 2,104,503 | Baker | Jan. 4, 1938 |
| 2,143,633 | Pearlstein | Jan. 10, 1939 |
| 2,229,568 | Hodgkins | Jan. 21, 1941 |
| 2,300,834 | Spooner | Nov. 3, 1942 |
| 2,376,468 | Wiseman | May 22, 1945 |

FOREIGN PATENTS

| Number | Country | Date |
|---|---|---|
| 407,256 | Great Britain | Mar. 15, 1934 |